Oct. 17, 1933.     L. V. ARONSON     1,930,501
PYROPHORIC LIGHTING MECHANISM AND ASSOCIATED CANE STRUCTURE
Filed Sept. 12, 1930     3 Sheets-Sheet 1
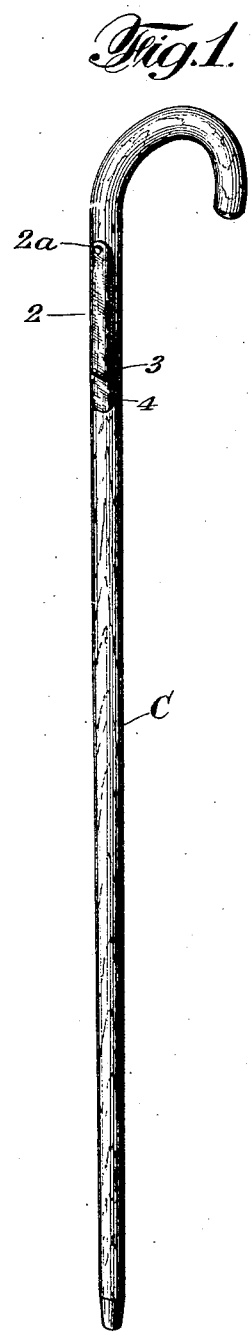
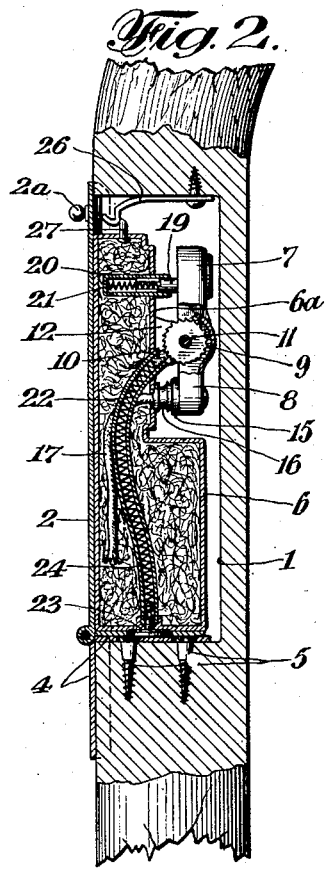
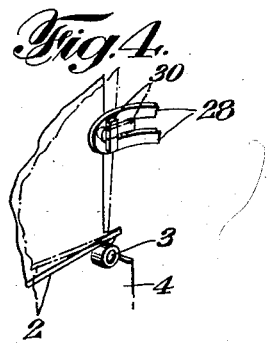
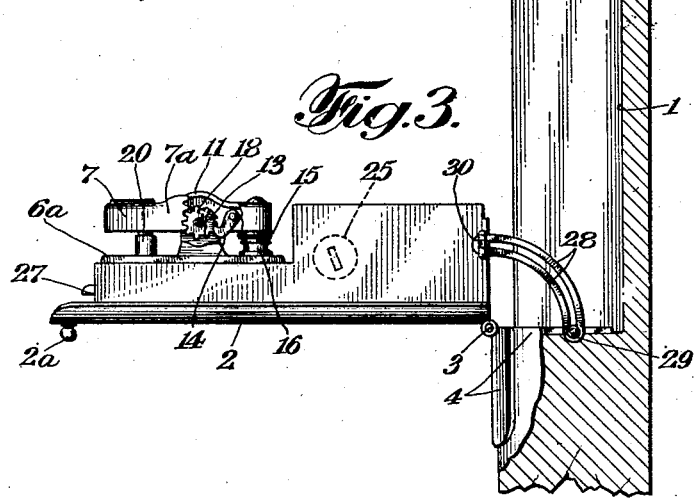
INVENTOR
*Louis V. Aronson*
BY
*Ward, Crosby & Neal*
ATTORNEYS Oct. 17, 1933.　　　　L. V. ARONSON　　　　1,930,501
PYROPHORIC LIGHTING MECHANISM AND ASSOCIATED CANE STRUCTURE
Filed Sept. 12, 1930　　　3 Sheets-Sheet 2
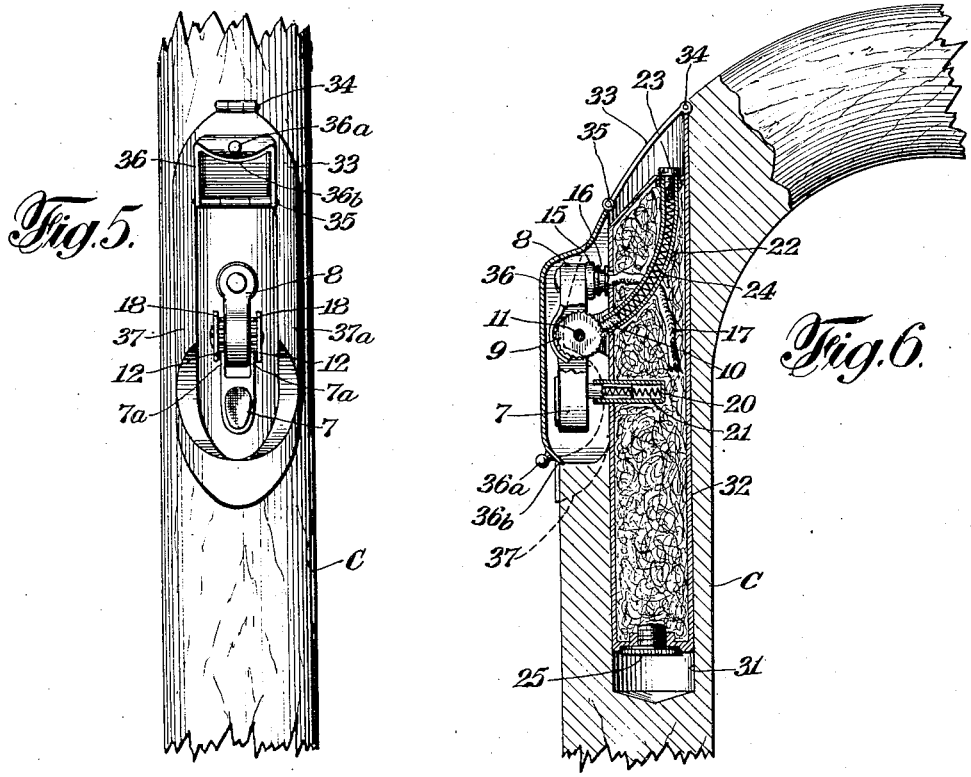
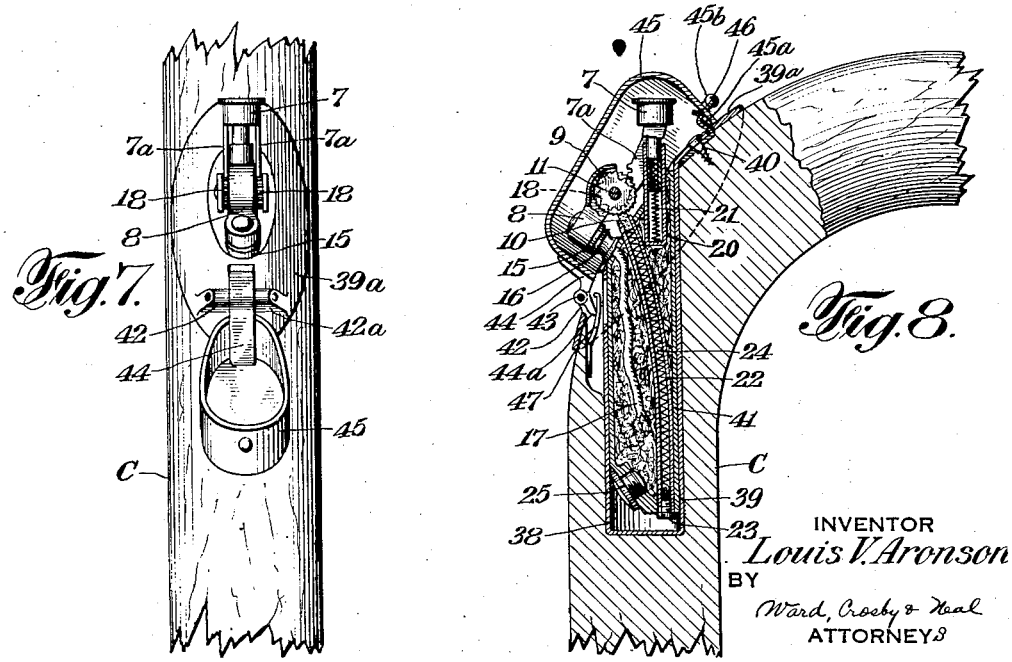
INVENTOR
Louis V. Aronson
BY
Ward, Crosby & Neal
ATTORNEYS

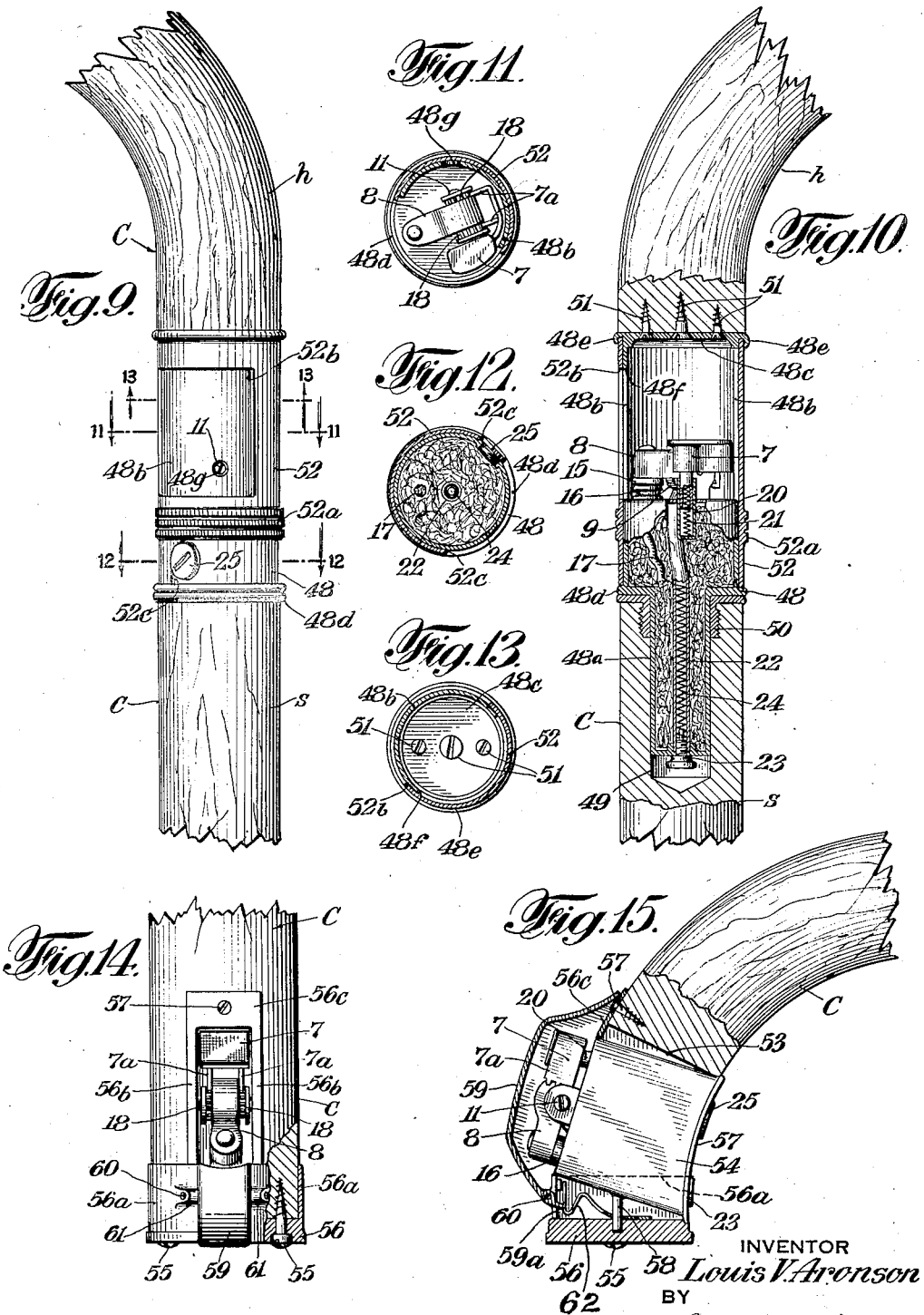

Patented Oct. 17, 1933

1,930,501

UNITED STATES PATENT OFFICE 1,930,501

PYROPHORIC LIGHTING MECHANISM AND ASSOCIATED CANE STRUCTURE

Louis V. Aronson, Newark, N. J., assignor to Art Metal Works, Inc., Newark, N. J., a corporation of New Jersey Application September 12, 1930
Serial No. 481,384

2 Claims. (Cl. 67—4.1)

My invention relates to arrangements or combinations including suitable pyrophoric lighting mechanism and an associated supporting device such as a cane, or the like.

My invention relates particularly to combined pyrophoric lighters and canes of novel construction and arrangement.

My invention relates to combined devices of the character stated which are simple, practical and efficient in operation.

Further objects, advantages and characteristics of my invention will become apparent from the following description taken in connection with the accompanying drawings.

For an understanding of my invention and for an illustration of some of the many forms thereof, reference is to be had to the accompanying drawings, in which:

Figure 1 is a perspective view illustrative of one adaptation of my invention;

Fig. 2 is an enlarged vertical sectional view, partly in elevation, of a part of the structure shown in Fig. 1;

Fig. 3 is a vertical sectional view, partly in elevation, showing parts of the invention positioned otherwise than as in Fig. 1;

Fig. 4 is a fragmentary perspective view of a part of my novel mechanism;

Fig. 5 is a front elevational view of another form of my invention;

Fig. 6 is a vertical sectional view, partly in elevation, of the arrangement shown in Fig. 5;

Fig. 7 is a front elevational view of another form of my invention;

Fig. 8 is a vertical sectional view, partly in elevation, of the arrangement shown in Fig. 7;

Fig. 9 is a side elevational view of another form of my invention;

Fig. 10 is a vertical sectional view, partly in elevation, of the arrangement shown in Fig. 9;

Figs. 11, 12 and 13 are transverse vertical sectional views, partly in plan, and are taken on the respective lines 11—11, 12—12, and 13—13 of Fig. 9;

Fig. 14 is a front elevational view, partly in section, of another form of my invention; and Fig. 15 is a side elevational view, partly in section, of the arrangement shown in Fig. 14.

In accordance with one prominent phase of my invention, suitable pyrophoric lighting mechanism is associated or combined with a cane in such manner that there is no impairment of the cane for use in the intended manner. Further, the operating parts of the lighter mechanism are disposed in such position on the cane that they are accessible for convenient operation or the relation is such that may readily be rendered thus accessible. Still further, by my invention, refueling of the lighter casing may readily be effected and it is an object of the invention to render readily accessible those parts of the lighter mechanism which most often require replacement or repair.

My invention may be defined or expressed by a variety of different mechanical arrangements of which, for purposes of explanation, typical examples are shown on the drawings forming a part of this application.

Referring to Figs. 1, 2, 3 and 4, C represents a suitable support such, for example, as a cane or the like with which pyrophoric lighting mechanism of any suitable or desired character is combined or associated. As shown particularly in Figs. 2 and 3, the cane C, adjacent the handle section thereof, comprises a suitable recess or aperture 1 opening laterally thereinto, said recess 1 being closed by any suitable plate or member 2 movably or pivotally related with respect to said cane C. As herein shown, the plate 2 is arcuate in correspondence with the cane periphery and, immediately adjacent one end thereof, comprises an actuating knob or member 2a. Adjacent its end removed from the knob 2a, the member 2 may be pivoted at 3 to a bracket 4, one leg of which may be disposed flush against the exterior cane surface and the other leg of which may rest upon the lower surface of the recess 1, Figs. 2 and 3, said last named bracket leg being secured to the adjacent cane section by screws 5, or the like. By virtue of the arrangement just described, the bracket 4 is securely held to the cane C in such position that the pivoted or hinged member 2 serves as a closure for the recess 1.

In accordance with the form of my invention shown in Figs. 1 through 4, the aforesaid member 2 serves as a support for pyrophoric lighting mechanism of any suitable character, said member 2 normally remaining in the position shown in Fig. 2 to retain said lighting mechanism in the recess 1. However, in accordance with my invention, the member 2 may be swung to the position illustrated in Fig. 3 whereby said lighting mechanism may be actuated to produce a flame utilizable for any desired purpose such, for example, as for ignition of a cigar, cigarette or the like.

As herein illustrated, the pyrophoric lighting mechanism comprises a casing 6 suitably secured to the interior surface of the aforesaid member 2. As the casing 6 is shown in Fig. 2, it may be said to comprise upper and lower sections, the lower section being more or less snugly received in the lower part of the recess 1 whereas the upper casing section has space at one side of the wall 6a thereof for the reception of the operating parts of the lighting mechanism.

As herein illustrated although not necessarily, such operating parts of the lighting mechanism include, primarily, a depressible member 7, a snuffer-carrying member 8, a serrated or roughened wheel 9, and a pyrophoric element 10. The serrated wheel 9 is rotatable on a screw or pin 11 carried by spaced standards 12 projecting from the aforesaid casing wall 6a. Disposed to one side of the serrated wheel 9 is a ratchet wheel 13, the two wheels being suitably secured together for free rotatable movement as a unit on the pin 11. The snuffer-carrying member 8 has spaced side walls freely pivoted on the pin 11 and within which the wheels 9 and 13 are received, said member 8 carrying a pawl 14 suitably biased toward and into engagement with the ratchet wheel 13. As is usual in the art, the member 11 carries a snuffer cap 15 coactable with a wick tube 16 projecting from the casing wall 6a, said wick tube 16 having extending therethrough a wick 17 which terminates interiorly of the casing 6.

As herein shown, the member 7 comprises spaced rack members 7a meshing, respectively, with pinions 18 rotatable on the aforesaid pin 11 and secured to the respective spaced side walls of the snuffer-carrying member 11 for oscillatory movement therewith. Projecting from the member 7 is a stem 19 telescopically received within a sleeve 20 extending through the casing wall 6a and into the casing 6, a spring 21 biasing the member 7 and stem 19 from left to right, Fig. 2.

The pyrophoric element 10 projects from a tube 22 extending through the casing 6, said tube 22 terminating at the lower wall of the casing 6 as the latter is shown in Fig. 2 and there receiving a threaded cap 23 which maintains a spring 24 under compression, said spring 24 being received by the tube 22 and coacting with the pyrophoric element 10 to bias the latter into engagement with the serrated wheel 9.

The casing 6 is adapted to receive and contain fuel of any suitable character such, for example, as jelly-like fuel or, if desired, liquid fuel of a character well known to the art, the fuel being suitably introduced into said casing 6, as by a passage opening in one wall of said casing 6, this opening being normally closed by a cap 25 and said casing containing a suitable mass of absorbent material, if desired.

The casing 6 together with the parts carried thereby are adapted to be releasably retained in the position shown in Fig. 2 by mechanism of any suitable character. As herein shown, there is thus utilized a leaf spring 26 suitably secured to the cane structure interiorly of the recess 1 and having a hook-shaped end adapted to coact with a pin 27 projecting from the upper wall of the casing 6 as the latter is positioned in Fig. 2. It is desirable that pivotal movement of the plate 2 with respect to the cane C be limited and, for this purpose, any suitable arrangement may be employed. As herein shown, there is utilized an arcuate arm 28 which may be pivoted at 29 to one arm of the bracket 4, said arm 28 being slotted for the reception of a pin 30 projecting from the casing 6.

Normally, all of the parts are positioned as shown in Fig. 2, the spring member 26 coacting with the pin 27 to positively retain the member 2 in such position that the recess 1 is closed whereby the member 2, in effect, forms a part of the cane exterior surface. Under such circumstances, the cane C may be used in the usual manner. However, when it is desired to light a cigarette or the like, the knob 2a may be manually actuated to disengage the pin 27 from the spring 26 whereupon the member 2 moves to the position shown in Fig. 3 and is restrained in such position by the coacting arm 28 and pin 30.

Accordingly, with the parts positioned as shown in Fig. 3, the member 7 may be depressed whereby the snuffer-carrying member 11 is swung in a counter-clockwise direction, Fig. 3, to expose the upper end of wick 17. When the member 11 is swung as just described, the pawl 14 coacts with the ratchet wheel 13 to impart a step of movement to the serrated wheel 9 whereby a shower of sparks are produced and propelled toward the upper end of wick tube 16 whereby a flame is produced at the end of the wick 17 projecting therebeyond. After the flame thus produced has served its intended purpose, the member 7 may be released whereupon the spring 21 returns the parts to their normal position, the snuffer cap 15 again seating upon the wick tube 16 and extinguishing said flame. Thereupon, the member 2 may be swung in a clockwise direction, Fig. 3, until returned to the position shown in Fig. 2, the spring 26 and pin 27 automatically coming into coacting relation to retain the parts in their intended position.

With the form of my invention shown in Figs. 1 through 4, the headed pin 30 is threaded or otherwise rotatably related to the arm 28. By virtue of this construction, said headed pin may be moved into the position shown by the dotted lines of Fig. 4 whereby it may be detached from the arm 28. The casing 6 may now be so swung with respect to the cane that the cap 23 is accessible for manipulation. This operation is effected when it becomes necessary or desirable to replace the pyrophoric element 10. However, it will be noted that the casing 6 may be refueled when it is in the position of Fig. 3 and that it is not necessary to manipulate the headed pin as described above to effect the refueling operation.

Referring to the form of my invention illustrated in Figs. 5 and 6, a cane C is shown as provided with a passage 31 which extends substantially axially of the straight section thereof. Received in the passage 31 is a suitable fuel casing 32 having associated therewith pyrophoric spark and flame-producing mechanism of any suitable character which, if desired, may be of the character hereinbefore described.

Preferably, the cane C of Figs. 5 and 6 is cut away or recessed at one side of the passage 31 to provide space for the reception of the lighter mechanism parts 7, 8, 9 etc. The fuel casing 32, at its upper end, may extend flush with the exterior cane surface or, as shown in Fig. 6, there may be walls which extend upwardly beyond the fuel casing proper, the space thus defined being closed by a member 33 which may be pivoted at 34 to give access to the upper fuel casing surface, the member 33 forming a part of the exterior cane surface and preferably conforming in configuration therewith.

Suitably pivoted at 35 preferably to lugs upstanding from the fuel casing 32 is a cover member 36 for the various lighter mechanism parts 7, 8, 9 etc. To some extent, it is desirable that this cover member 36 conform in configuration with the exterior cane surface.

The cover member 36 may be provided with an actuating knob 36a and it may be releasably retained in closed position in any suitable manner. Thus, for example, there may be provided a yoke which is formed by the members 37, 37a, these members merging into the exterior cane surface and defining the opening to be closed by the cover member 36, the lower tip 36b of which is adapted to be resiliently engaged with said members 37, 37a where their lower sections are joined together.

With the form of my invention disclosed in Figs. 5 and 6, the parts are positioned normally as shown in Fig. 6. When it is desired to light a cigar, cigarette or the like, the cover member 36 is swung to its open position as shown in Fig. 5 whereupon the lighting mechanism may be actuated to produce a flame. After the latter has served its intended purpose, the member 7 is released whereupon the snuffer cap 15 is automatically seated to extinguish the flame. Thereupon, the cover member 36 may be returned to its normal position.

The member 33 may be swung on its pivot should it be necessary to inspect the mechanism or to provide a new pyrophoric element and, with the disclosed arrangement, the fuel casing 32 may be removed from the passage 31 when it becomes necessary to refuel said casing. As herein illustrated, the fuel casing 32 is frictionally retained in the position shown although, if desired, any other suitable arrangement may be employed for accomplishing this purpose.

Referring to Figs. 7 and 8, there is illustrated a form of my invention corresponding somewhat with the form thereof illustrated in Figs. 5 and 6 although differing therefrom in some important respects. As shown particularly in Fig. 8, a cane C comprises an axial passage 38 which receives a sleeve 39 having a flange 39a disposed on the exterior cane surface, said flange 39a preferably being secured to said surface in any suitable manner, as by one or more screws 40.

Slidable, preferably in close-fitting frictional relation, within the sleeve 39 is a fuel casing 41, the sleeve and fuel casing preferably being circular in horizontal cross-section. Preferably, the fuel casing 41 comprises an inclined top wall which carries the actuating parts of the lighting mechanism, these being the same as hereinbefore described or different as may be desired. As herein shown, the lighting mechanism is generally the same as that described in connection with Figs. 1–6 inclusive although, as will be noted, the member 7, its rack members 7a and the sleeve 20 are arranged somewhat differently so that sparks are produced in response to movement of the member 7 substantially axially of the cane C.

Any suitable arrangement may be employed for covering the lighting mechanism. As herein illustrated, ears 42, 42a upstand from the flange 39a, these ears carrying a pin 43 on which a bracket 44 is freely pivoted, said bracket supporting and carrying a cover member 45 of any suitable receptacle-like configuration. In Fig. 8, the cover member 45 is shown as in closed position, said cover member being releasably retained in that position in any suitable manner. As herein illustrated, a spring clip 46 extends laterally from the flange 39a, said spring clip 46 coacting with a lug 45a interiorly carried by the cover member 45 for releasably retaining the latter in closed position, a knob 45b carried by said cover member 45 being provided, if desired, for actuating the latter.

Under some circumstances, it may be desirable to provide an arrangement for biasing the cover member 45 toward closed position and for retaining the same in open position. In the example shown, this function is attained by providing the bracket 44 with a tail section 44a which extends through a slot in the bracket 39a and coacts with a leaf spring 47 suitably secured in a recess disposed at one side of the passage 38. As the parts are positioned in Fig. 8, the spring 47 coacts with the tail section 44a of bracket 44 to apply a clockwise biasing effect to the cover member 45. However, when the cover member 45 is in open position, the spring 47 coacts with the aforesaid tail section 44a to retain said cover member in said open position.

With the arrangement of Figs. 5 and 6, the force for operating the lighter mechanism is applied substantially laterally of the straight cane section whereas, with the arrangement of Figs. 7 and 8, the operating force is applied substantially axially of the straight cane section. In some respects, therefore, the construction of Figs. 7 and 8 admits of more convenient operation since the hand of a person while holding the cane is in the proper position on the curved cane handle to manipulate the cover section 45 and operating member 7 by thumb or finger action.

In Figs. 9, 10, 11, 12 and 13, there is illustrated another form of my invention wherein the lighting mechanism is interposed between and connects the handle section h and straight section s of a cane C.

As shown, there is provided a fuel casing 48 having a diameter substantially the same as that of the cane and which has a lower depending section 48a received in a depression 49 opening axially into the straight cane section s. This fuel casing 48 is adapted to be detachably secured to said straight cane section s in any suitable manner. In the example shown, the casing section 48a has a sleeve 50 securely fastened thereto, said sleeve 50 being threaded to the straight cane section s or to a member, not shown, but disposed in proper position on the cane section s.

The fuel casing 48 also comprises an upwardly extending circular wall 48b terminating in a top section or wall 48c suitably secured to the cane handle section h, as by screws 51.

Freely rotatable on the fuel casing 48 and its circular wall 48b is a sleeve 52 which may have an operating section 52a. As shown, the sleeve 52 may rest upon an extending circular section 48d of the fuel casing 48 while the aforesaid top wall 48c may have a circular lip section 48e embracing the upper end of said sleeve 52.

The aforesaid circular wall 48b may be apertured or provided with a passage 48f giving access to the space defined by said wall 48b. The sleeve 52, likewise, is provided with an aperture or passage 52b adapted to be brought into registering relation with respect to the aperture 48f upon rotation of said sleeve 52 to the proper position. Preferably, both of the aforesaid apertures are dimensioned substantially the same and, when in registering relation, access may be had to the lighter operating mechanism which, as shown, is disposed within the space defined by the upstanding casing wall 48b.

Suitable stop means should be provided for coaction with the sleeve 52 to so limit its rotational movement that it may be moved to one position wherein the aforesaid registering relation of the two apertures exists and to another position wherein the sleeve 52 covers the aperture 48f. As herein shown, the cap 25 which closes the filling opening for the casing 48 is thus utilized, said cap 25 serving as a stop member coactable with opposite walls 52c of a cutaway section of the sleeve 52, Fig. 12.

Normally, the sleeve 52 remains in the position shown in Fig. 9 at which time the aperture 52b thereof overlies a section of the upstanding casing wall 48b whereby the aperture 48f of the latter is closed. Under such circumstances, the cane may be used in the ordinary manner.

When it becomes desirable to ignite a cigar, cigarette or the like, the sleeve 52 may be rotated from the position shown in Fig. 9 until it comes to the position shown in Fig. 10 at which time the apertures 48f and 52b are in registering relation whereby the space defined by the upstanding wall 48b is accessible.

The lighter mechanism of Figs. 9–13 inclusive is substantially the same as that hereinbefore described and is carried by the top wall of the fuel casing 48, said mechanism comprising the member 7 which may be depressed toward said top wall to produce sparks and to cause ignition of fuel at the upper end of wick 17. Accordingly, when the two apertures have been brought to registering relation as stated above, the member 7, as shown in Figs. 10 and 11, may be depressed by thumb or finger action to cause elevation of the snuffer-carrying member 8 which is accompanied by limited rotation of the serrated wheel 9. After the flame has served its intended purpose, the pressure on the member 7 may be released, whereupon the parts return to their normal respective positions and the sleeve 52 also being returned to the position shown in Fig. 9 to thereby place all of the parts in their normal, non-operative positions.

As stated, the lighter mechanism of Figs. 9–13 inclusive is substantially the same as that hereinbefore described and as a matter of fact, such lighter mechanism is almost identical with that disclosed in Figs. 1–6 inclusive with the exception that the members 7a of Figs. 9–13 inclusive are so shaped as to produce a more compact device, this being attained by virtue of the fact that the position of the operating member 7 of Figs. 9–13 inclusive has been transposed through an angle of about 90 degrees with respect to the arrangement illustrated in Figs. 1–6 inclusive. However, it shall be understood that my invention is not to be limited to lighter mechanism of the character illustrated in Figs. 9–13 inclusive since many other types of lighter mechanism may be employed in connection with the general arrangement disclosed in said Figs. 9–13 inclusive.

As will clearly appear, fuel of any suitable character may be supplied to the fuel casing 48 upon removal of the readily accessible closure cap 25. When it becomes necessary to repair the pyrophoric element or supply a new one, the fuel casing 48 may readily be detached from the straight cane section s whereupon access may be had to the cap 23 to effect removal thereof.

As will be noted, the fuel casing 48 together with its upper extension 48b forms a rigid mechanical connection between the two cane sections h and s. In the space formed by a part of this mechanical connection, the operating parts of the lighter mechanism are disposed and access may be had to such space by movement to a predetermined position of a sleeve or cylinder which is rotatable on the fuel casing and its upper extension. An arrangement of this character is advantageous and highly satisfactory in operation.

If desirable and necessary, the casing wall 48b may be provided with an opening 48g, Figs. 9 and 11, disposed in alinement with the pin or screw 11. Through this opening 48g, a suitable tool may be introduced for the purpose of manipulating said pin, this being possible when the sleeve 52 is in closed position as shown in Fig. 9.

Referring to Figs. 14 and 15, there is illustrated a form of my invention wherein the lighter mechanism is carried by and disposed at the extreme end of the cane handle. As shown, the extreme handle end of the cane C of Figs. 14 and 15 is bifurcated longitudinally as indicated at 53 and, in the space thus formed, there is disposed a generally rectangular fuel casing 54 which may correspond generally with casings of the character customarily utilized with pocket lighters.

Disposed flush against the end of the cane C and suitably held thereto, as by screws 55, is a member 56 which has a sleeve 56a closely embracing the cane end. A pair of spaced yoke-forming members 56b, 56b extend along the cane surface at the top of the bifurcation 53 and these members are joined together by a section 56c which is suitably secured to the cane surface, as by a screw 57.

As shown in Fig. 15, the casing 54 corresponds substantially in height with the thickness of the cane C, the lower and upper casing surfaces, therefore, being substantially flush with opposite cane surfaces. For retaining the casing 54 in associated relation with respect to the cane C, the lower casing wall 57 may form an outwardly extending flange one section of which coacts with a surface of the cane and another section of which coacts with a surface of the member 56. As shown in Fig. 15, a member 58 secured to and projecting laterally from the casing 54 extends into an opening provided in the member 56. The member 56 prevents movement of the casing 54 in one direction while movement of said casing 54 in the other direction is prevented due to engagement of the flanges of casing wall 57 with the adjacent cane surfaces.

Although a particular arrangement has been illustrated and described above for retaining the casing 54 associated with the cane, it shall be understood that many other suitable arrangements may be utilized as desired.

As illustrated in Figs. 14 and 15, the lighting mechanism is of a type well known to the art and is substantially the same as hereinbefore described in connection with Figs. 1–6 inclusive. Preferably, this mechanism is provided with a suitable cover member 59 which may be pivoted on a member 60 extending through ears 61 extending laterally from the exterior surface of sleeve 56a. If desired, the cover member 59 may be retained either in open or closed position somewhat the same as the hereinbefore described cover member 45 and, to this end, said cover member 59 may be provided with a tail section 59a which extends through a slot formed in the sleeve 56a and coacts with a spring 62 carried on the interior surface of the member 56.

When it is desired to refuel the casing 54, it is only necessary to remove the cap 25 whereupon any suitable fuel may be supplied to said casing. Similarly, the cap 23 may be removed when it becomes necessary to substitute a new pyrophoric element for a used one. The cap 23 is accessible for ready manipulation because the sleeve 56a is apertured so as to fit therearound.

In some respects, some of the various types of pyrophoric lighting mechanism hereinbefore described, are novel per se. It is to be distinctly understood, therefore, that, as regards these novel characteristics, the invention is not to be limited to the combination or association of such novel lighting mechanism with a cane or other supporting device.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. Pyrophoric lighting mechanism adapted to be associated with an elongated rod-like member having a recess opening laterally thereinto, said lighting mechanism comprising a movable snuffer-carrying member, spark-producing means, and an operating member for said snuffer-carrying member and means, a pivoted plate forming a cover for said recess and having the entire lighting mechanism secured thereto, and means for releasably retaining said plate in recess-closing position.

2. Pyrophoric lighting mechanism adapted to be associated with an elongated rod-like member having a recess opening laterally thereinto, a pivoted plate forming a cover for said recess and having said lighting mechanism secured thereto, said lighting mechanism including a liquid fuel container and a pyrophoric holding tube extending upwardly through said container, means for releasably retaining said plate in recess-closing position, and means for restraining pivotal movement of said plate beyond a predetermined position, said last named means being releasable to permit movement of said plate beyond said position so that the tube is accessible for refilling.

LOUIS V. ARONSON.